Figure 1:
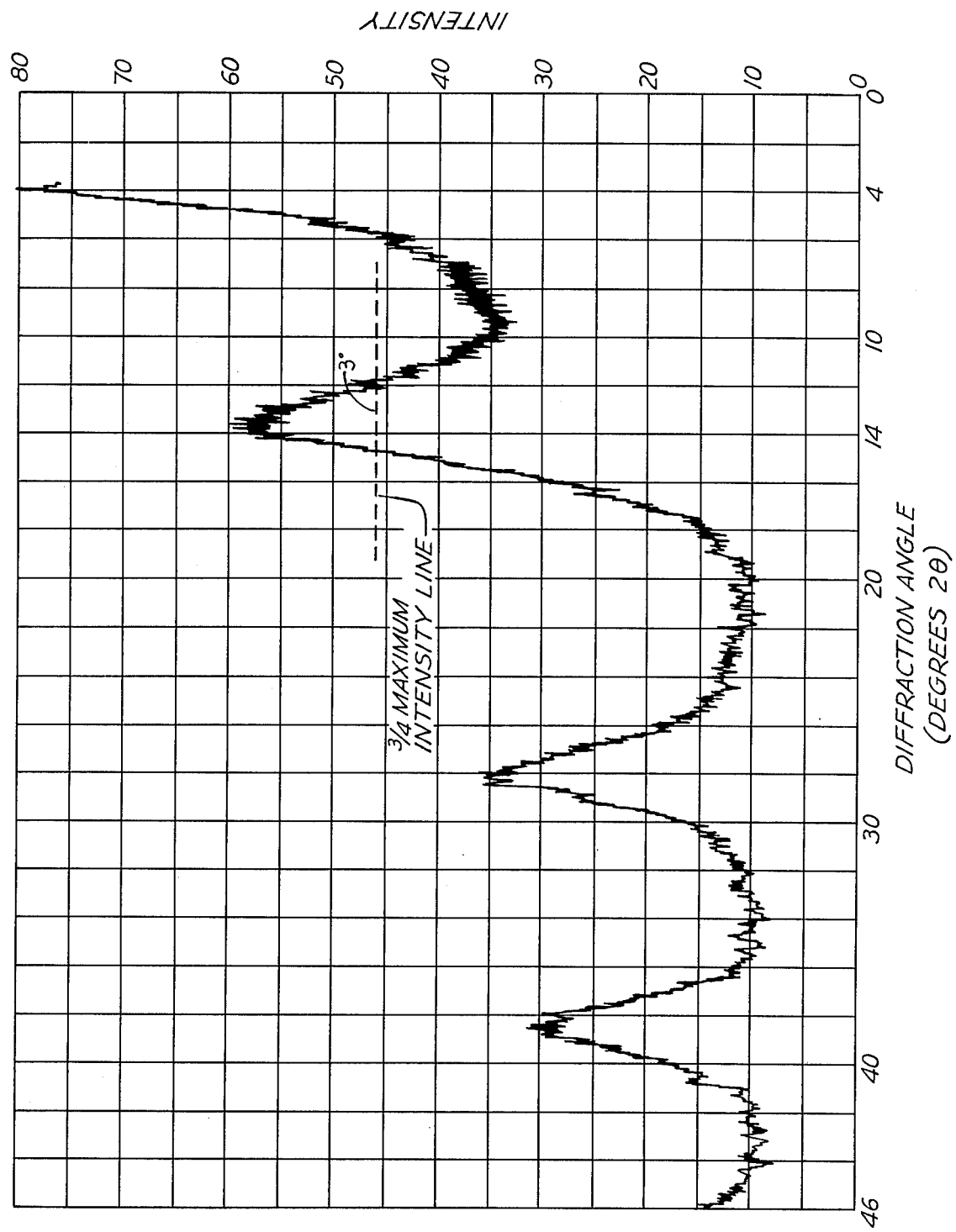

United States Patent [19]

Kehl et al.

[11] 4,081,353

[45] Mar. 28, 1978

[54] HYDRODESULFURIZATION WITH A SPECIFIC ALUMINA-SUPPORTED CATALYST

[75] Inventors: William L. Kehl, Pittsburgh; Angelo A. Montagna, Monroeville, both of Pa.

[73] Assignee: Gulf Research & Development Company, Pittsburgh, Pa.

[21] Appl. No.: 732,650

[22] Filed: Oct. 15, 1976

[51] Int. Cl.² .............................................. C10G 23/02
[52] U.S. Cl. .................................... 208/216; 208/217; 252/465; 252/466 J
[58] Field of Search ................ 208/216, 217; 252/465, 252/466 J

[56] References Cited

U.S. PATENT DOCUMENTS

| | | |
|---|---|---|
| 3,340,180 | 9/1967 | Beuther et al. ........................ 208/216 |
| 3,472,759 | 10/1969 | Masologites et al. ................ 208/216 |
| 3,846,285 | 11/1974 | Beuther et al. ........................ 208/216 |
| 3,940,330 | 2/1976 | Beuther et al. ........................ 208/216 |
| 3,941,683 | 3/1976 | Beuther et al. ........................ 208/216 |

Primary Examiner—George Crasanakis

[57] ABSTRACT

A process for the hydrodesulfurization of feedstocks under comparatively low hydrogen partial pressures, i.e. less than about 1200 psig (8.27 MPa) in contact with a catalyst containing a hydrogenation component supported on a particular carrier. The carrier is a substantially silica-free alumina prepared by calcining a material comprising a dried alumina (i) containing from about 1.2 to about 2.6 moles of water of hydration per mole of $Al_2O_3$, (ii) having an (020) line width at 14° (2 $\theta$) at 3/4 maximum intensity of from about 2.0° to about 5.0°, and (iii) having an intensity ratio relative to the intensity at 10° (2 $\theta$) of about 1.3 to about 5.0.

12 Claims, 6 Drawing Figures

DIFFRACTION ANGLE
(DEGREES 2θ)

EVALUATION OF NiCoMo IMPREGNATED
BASE CATALYSTS FOR LOW PRESSURE HDS

HYDRODESULFURIZATION WITH A SPECIFIC ALUMINA-SUPPORTED CATALYST

This invention relates to a process for the hydrodesulfurization of a feedstock employing comparatively low hydrogen partial pressures and a catalyst comprising a hydrogenation component and a specific carrier. More particularly this invention relates to a hydrodesulfurization process in which the hydrogen partial pressure is less than about 1200 psig (8.27 MPa), and wherein the catalyst carrier is obtained by calcining a material consisting of a particular form of a dried alumina.

DESCRIPTION OF STATE OF THE ART

The hydrodesulfurization of various feedstocks by contacting them with hydrogen and a catalyst containing a hydrogenation component on a support has previously been suggested in the prior art. Older prior art in the area relating to hydrodesulfurization required the use of elevated temperatures and pressures ranging up to 20,000 psig (138 MPa). More recent prior art, e.g. U.S. Pat. No. 3,846,285 issued to Beuther et al on Nov. 5, 1974, describes the hydrodesulfurization of metals containing hydrocarbons at lower temperatures and pressures having a catalyst having as the support a material consisting of two different crystalline alumina hydrates. The present invention relates to the discovery of a further improved form of an alumina support for the catalyst to be used in a process for the hydrodesulfurization of hydrocarbons.

The chemistry and crystallographic nature of alumina is quite complex and has been under vigorous study for many years. Such a study is justified by the quest for improved aluminas to serve as supports for various catalytic purposes. For reasons which are not fully understood, the nature of the alumina support is very influential in the overall activity, selectivity and aging of catalysts containing a metalliferous hydrogenation component when used in a process for the desulfurization and/or demetallization of hydrocarbon oils. Thus prior art patents such as U.S. Pat. No. 3,188,174 to Kehl et al and U.S. Pat. No. 3,222,273 to Kehl et al teach the preparation of pseudoboehmite and also teach the usefulness of the pseudoboehmite aluminas as precursors of supports for catalysts destined for use in the hydrogenative desulfurization of petroleum charge stocks. The more recent '285 patent to Beuther et al mentioned above teaches, as noted, the use of a mixture of a dihydrate and trihydrate of alumina as a catalyst support for improved aging and regenerability characteristics when used for the desulfurization of metals containing hydrocarbon charge stocks. The dihydrate portion of the Beuther et al catalyst support has the same chemical formula as the pseudoboehmite of Kehl et al.

As is well known, there is in reality a family of aluminas which differ in chemical formula by the moles of water associated with the $Al_2O_3$. Thus alumina monohydrate is known as "boehmite"; alumina trihydrate is variously known as "gibbsite" and "bayerite". Kehl et al in the patents referred to above were the first to recognize the existence of intermediate water content aluminas referred to above as "pseudoboehmite", and taught techniques for preparing the pseudoboehmites.

It has now been found that pseudoboehmites ($Al_2O_3 \cdot 1.2-2.6\ H_2O$) can be prepared, which, although having substantially the same moles of water per mole of alumina, differ after drying and before calcining in their X-ray diffraction patterns, especially in the 8° to 16° (2 $\theta$) region. For reasons which are not understood, it has been found that catalysts supported on certain pseudoboehmites possess unusual and unexpected activity for the desulfurization of hydrocarbons at low temperatures and pressure.

BROAD STATEMENT OF INVENTION

In accordance with the invention, an improved hydrodesulfurization process under comparatively low hydrogen partial pressure has been discovered which comprises conducting the hydrodesulfurization process in the presence of a catalyst comprising a metalliferous hydrogenation component on a substantially silica-free alumina which after drying and before calcining (i) contains from about 1.2 to about 2.6 moles of water of hydration per mole of $Al_2O_3$, (ii) has an (0.20) line width at 14° (2 $\theta$) at three-fourths maximum intensity of from about 2.0° to about 5.0°, and (iii) has an intensity ratio relative to the intensity at 10° (2 $\theta$) of about 1.3 to about 5.0.

FEEDSTOCKS

The feedstocks suitable for treatment in accordance with the process of this invention include substantially any oil-like stock boiling above about 400° F. (204° C.), such as, for example, oils derived from shale, tar sands, or coal; substantially full petroleum crudes boiling above 400° F. (204° C.); topped crudes; reduced crudes; atmospheric or vacuum tower bottoms; or any individual fraction. Thus the feedstock can be a topped crude from which only the lowest boiling materials such as naphtha boiling materials have been removed; or, more usually, it can be a residual fraction boiling above about 950° to 1000° F. (510° to 538° C.). Similarly it can be any of the intermediate distillate fractions such as furnace oil, boiling from 400° to about 650° F. (204° to 343° C.); or gas oil boiling from about 650° to about 950° F. (343° to 510° C.). The feedstock can also be a fraction or fractions separated on the basis of solubility rather than boiling range, such as, for example, an asphaltene or maltene fraction. It is preferred, however, in the process of this invention to employ a feedstock which contains a substantial quantity of residual components, asphaltic contaminants and metalliferous components. Accordingly, the process of this invention most advantageously can be used for the treatment of residual petroleum fractions boiling substantially above 950° F. (510° C.) and containing the asphaltene content of the crude.

The above described feedstocks, particularly the residual petroleum based feedstocks, can contain up to about five to six weight percent sulfur, although usually such feedstocks contain no more than about four weight percent sulfur. Similarly the higher boiling feedstocks contain substantial quantities of metalliferous contaminants, for example, greater than about 50 ppm of metals, particularly nickel and vanadium. Additionally the feedstocks treated in accordance with the process of this invention can be materials which have been previously subjected to a sulfur removal operation, in which case the subject invention is effective to provide a product having extremely low sulfur contents, for example, less than about 0.5 percent by weight.

As used herein, the terms "residual", "residue" or "residual components" are meant to describe the most difficultly vaporizable portions of crude oils which normally cannot be distilled, in the absence of a vacuum, without effecting decomposition of the stock.

Indicative of such residual components is a Conradson Carbon Number usually greater than about 1. Such residual components can typically be isolated as a separate fraction by vacuum distillation, i.e. a vacuum tower bottoms, and generally boil above about 950° to 1000° F. (510° to 538° C.). The amount of residual components in a crude petroleum oil can vary from substantially zero, as in a Pennsylvania crude, up to as high as about 25% by volume for some Mideast crudes. It will be understood, of course, that the concentration of residual components in a fraction of a crude oil, such as a topped crude or reduced crude, will be dependent upon the original concentration of residual components in the full crude and the amount of lighter materials removed. Generally, the feedstocks employed in the process of this invention will contain at least 2% by volume residual components and preferably at least about 5% by volume. It will also be understood that the process of this invention provides increased advantages when treating stocks containing increased quantities of residual components.

OPERATING CONDITIONS

The operating conditions employed in the process of this invention comprise a temperature in the range from about 600° to about 1000° F. (316° to about 538° C.) and preferably from about 650° to about 800° F. (343° to about 427° C.). The space velocity can be in the range from about 0.1 to about 10.0, preferably less than about 5.0 and more preferably from about 0.1 to about 2.0 volumes of charge stock per volume of catalyst per hour. The hydrogen feed rate employed ranges from about 500 to about 10,000 standard cubic feet per barrel of feedstock, preferably is in the range from about 1000 to 8000 standard cubic feet per barrel and more preferably is in the range from about 2000 to about 6000 standard cubic feet per barrel. The hydrogen partial pressure employed in the process of this invention is in the range from about 50 to about 1200 psig (about 0.34 to about 8.27 MPa), preferably less than about 1000 psig (6.9 MPa), and even more preferably less than about 800 psig (5.5 MPa), with superior results being obtained with hydrogen partial pressures as low as 500 or 400 psig (3.45 or 2.75 MPa). Usually it is preferred to employ hydrogen partial pressures of at least 200 psig (1.38 MPa). The total pressures employed in the process of this invention do not greatly exceed the hydrogen partial pressures, and the maximum total pressure is limited to a maximum of about 1500 psig (10.3 MPa) and preferably a total pressure of less than about 1000 psig (6.89 MPa).

CATALYST DESCRIPTION

The catalyst employed in the process of this invention comprises a minor proportion of a metalliferous hydrogenation component, such as one or more of the Group VI and Group VIII metals, their oxides and sulfides, composited with a major amount of a particular alumina. The total amount of the hydrogenation component is from 2 to 25 weight percent, preferably 4 to 15 weight percent, of the catalyst based on the metal in the zero valent state. Preferably, the hydrogenating component is one or more of the metals nickel, cobalt, platinum, palladium, molybdenum and tungsten. The particular alumina required in this invention must be substantially silica-free. Thus, any silica incorporated cannot be more than contaminant level, i.e., less than 1% by weight, and preferably less than about 0.5% by weight. Accordingly, the alumina employed in the process of this invention is not to be a so-called silica-stabilized alumina, i.e. a material containing silica in an amount from about 1 up to about 5% or 6% by weight. Additionally, the catalyst can be promoted with from about 1% to about 10% by weight, preferably at least about 2.5% of a Group IVB metal, i.e. titanium, zirconium, and hafnium. It is preferred to employ catalysts containing no more than about 8% by weight Group IVB metal, and of these metals it is preferred to employ titanium and zirconium, particularly titanium. It has also been found advantageous that the Group IVB metal not be incorporated into the carrier but rather be deposited on the carrier such as by impregnation of the calcined carrier.

It has now been found in accordance with the invention that an improved alumina can be prepared which results in even greater activity for a hydrodesulfurization catalyst under mild conditions than the alumina supports suggested in the prior art. The new improved alumina after drying but prior to calcining contains from about 1.2 to 2.6 moles of water of hydration per mole of alumina; has an (020) line width at 14° (2 $\theta$) and at three-fourths maximum intensity from about 2.0° to 5.0°, preferably 3° to 5°; and has an intensity ratio relative to the intensity at 10° (2 $\theta$) of from 1.3 to 5.0, preferably 1.5 to 3.0. A typical x-ray diffraction pattern for an alumina to be used as a support for the catalysts of this invention is shown on FIG. 1. The line width and intensity ratio in an X-ray diffraction pattern depend upon the instrumentation conditions used. For purposes of the subject invention, the following instrumentation conditions apply in defining the line width and intensity ratio:

1. employ a Picker X-ray powder diffractometer using a copper target X-ray diffraction tube operated at 35 kilovolts and 16 milliamperes tube filament current with 1° slits and a nickel filter to remove the copper $K_\beta$ radiation.

2. employ a detector consisting of a sealed gas-filled proportional counter used in conjunction with a pulse amplitude discriminator; and 3. the detector scanning rate should be 1° (2 $\theta$) per minute, and the output signal should be recorded on a strip chart recorder traveling at 15 inches (37.5 cm) per hour with a scale factor set at 400 counts per second at full scale. Referring to FIG. 1, it can be seen that the (020) line width at about 14° (2 $\theta$) and at three-fourths maximum intensity is about 3.0°.

The (020) line width at about 14° (2 $\theta$) and three-fourths maximum intensity is a rough measure of crystallite size. As the line width increases, the crystallite size decreases. Pseudoboehmites falling within the chemical formula $Al_2O_3 \cdot 1.2$–$2.6 H_2O$ can have greatly differing line widths at about 14° (2 $\theta$), as is shown in FIGS. 2, 3 and 4 (designated pseudoboehmite Types I, II and III).

Figure 2:
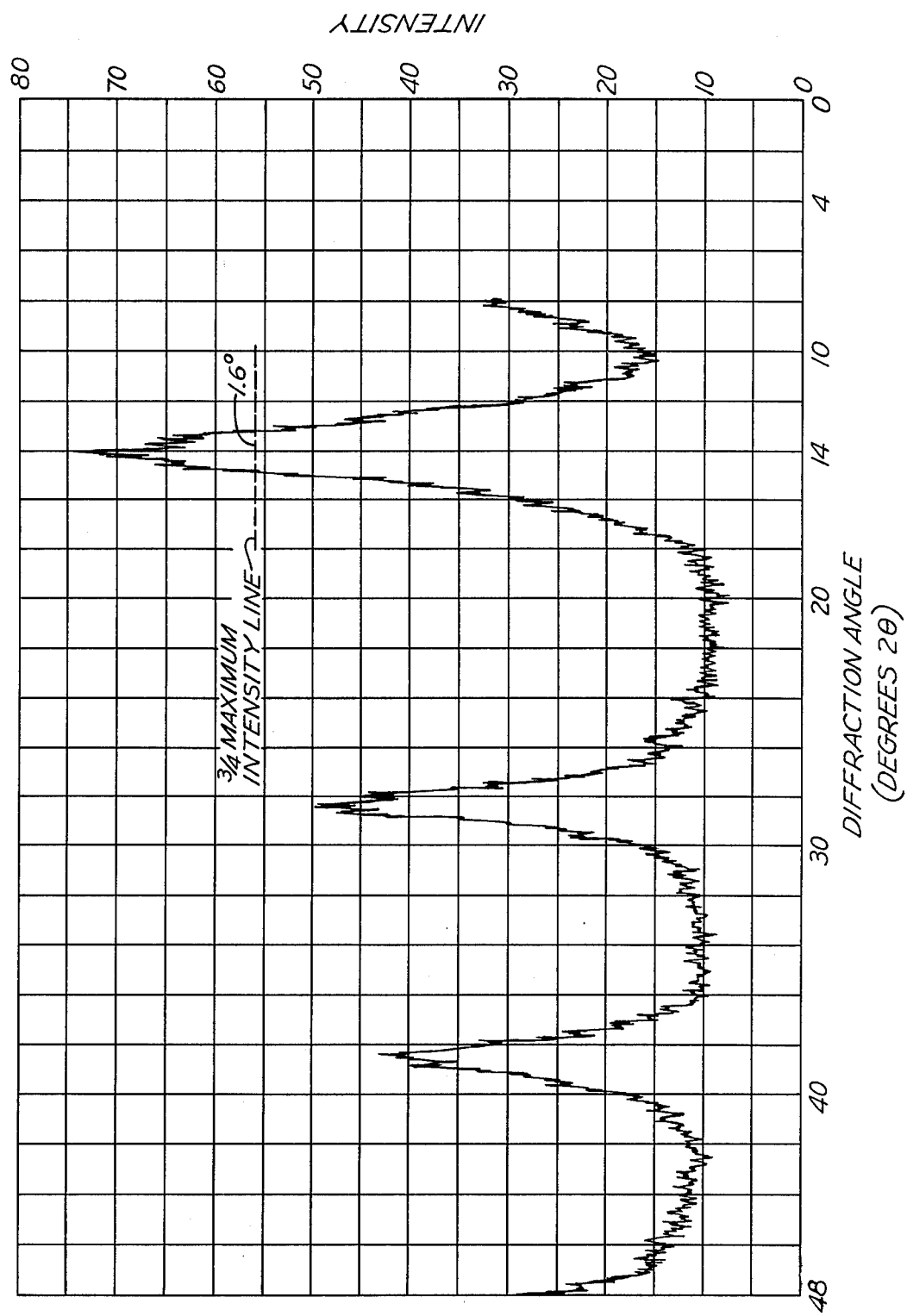
Figure 3:
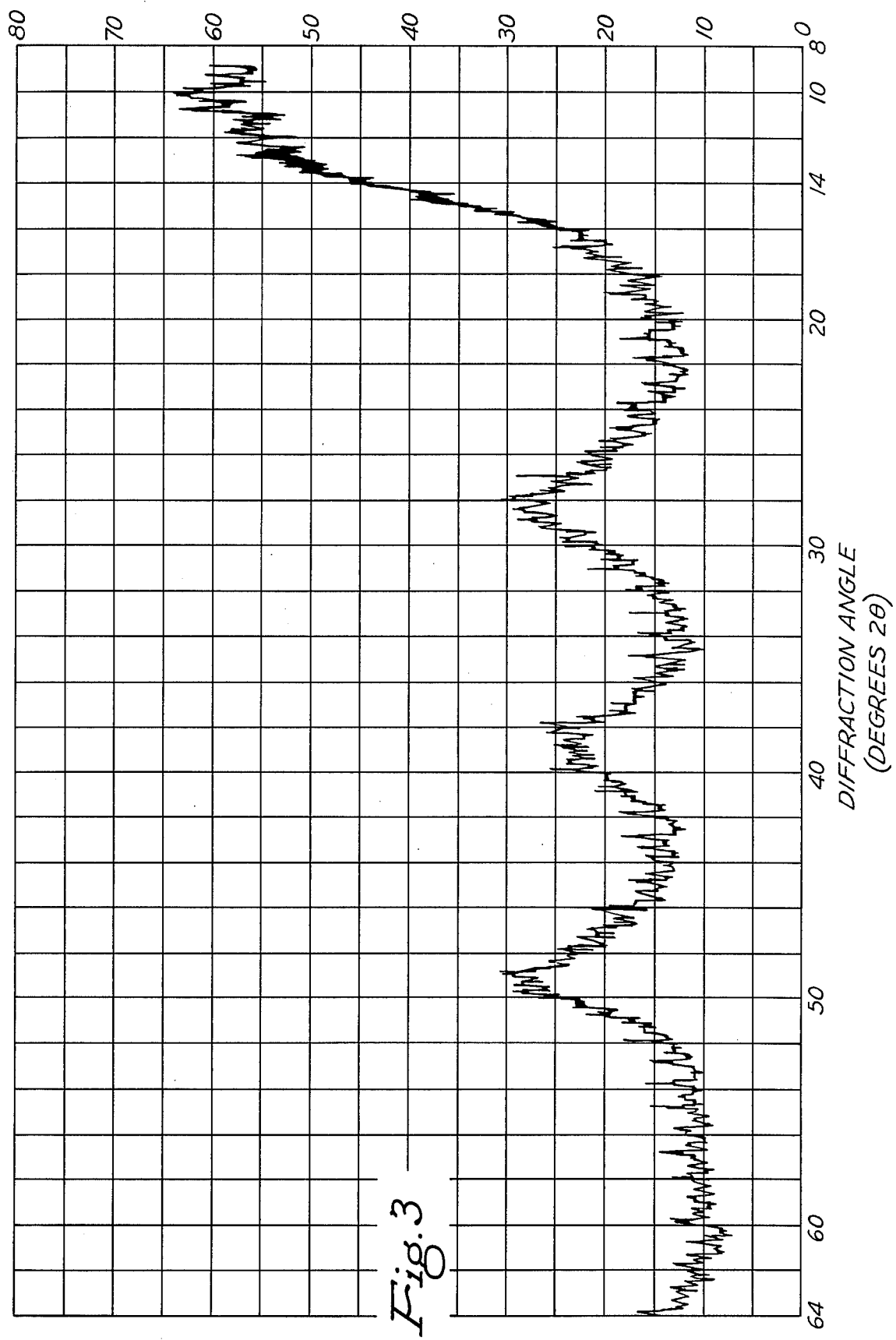
Figure 4:
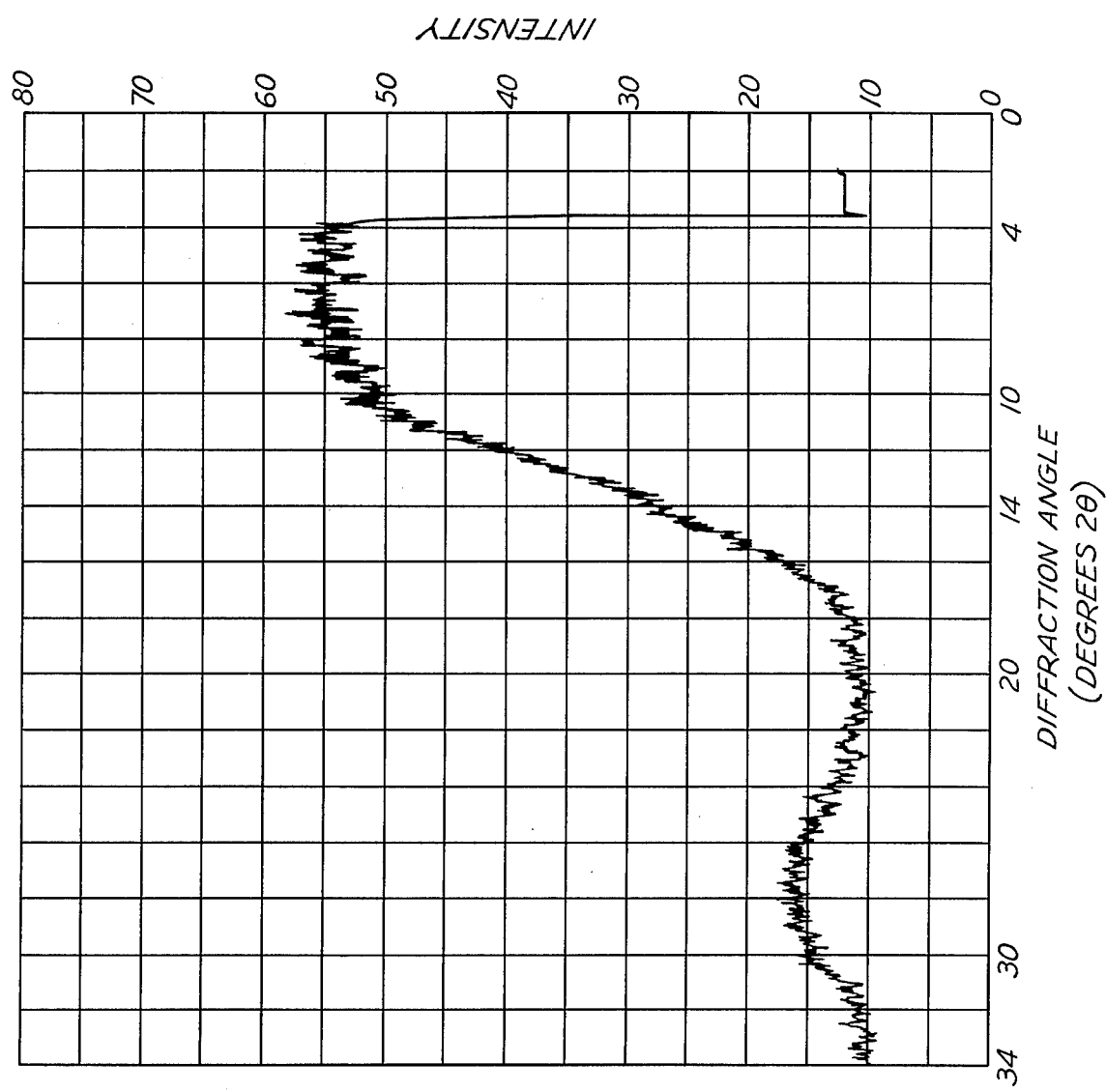

Referring to FIGS. 2, 3 and 4, the (020) line width at about 14° (2 $\theta$) and at three-fourths maximum intensity is only measurable in FIG. 2 and is about 1.6°, while the line width in FIGS. 3 and 4 is not measurable, indicating that the crystallites are highly disordered along the b axis of the crystal lattice.

Figure 5:
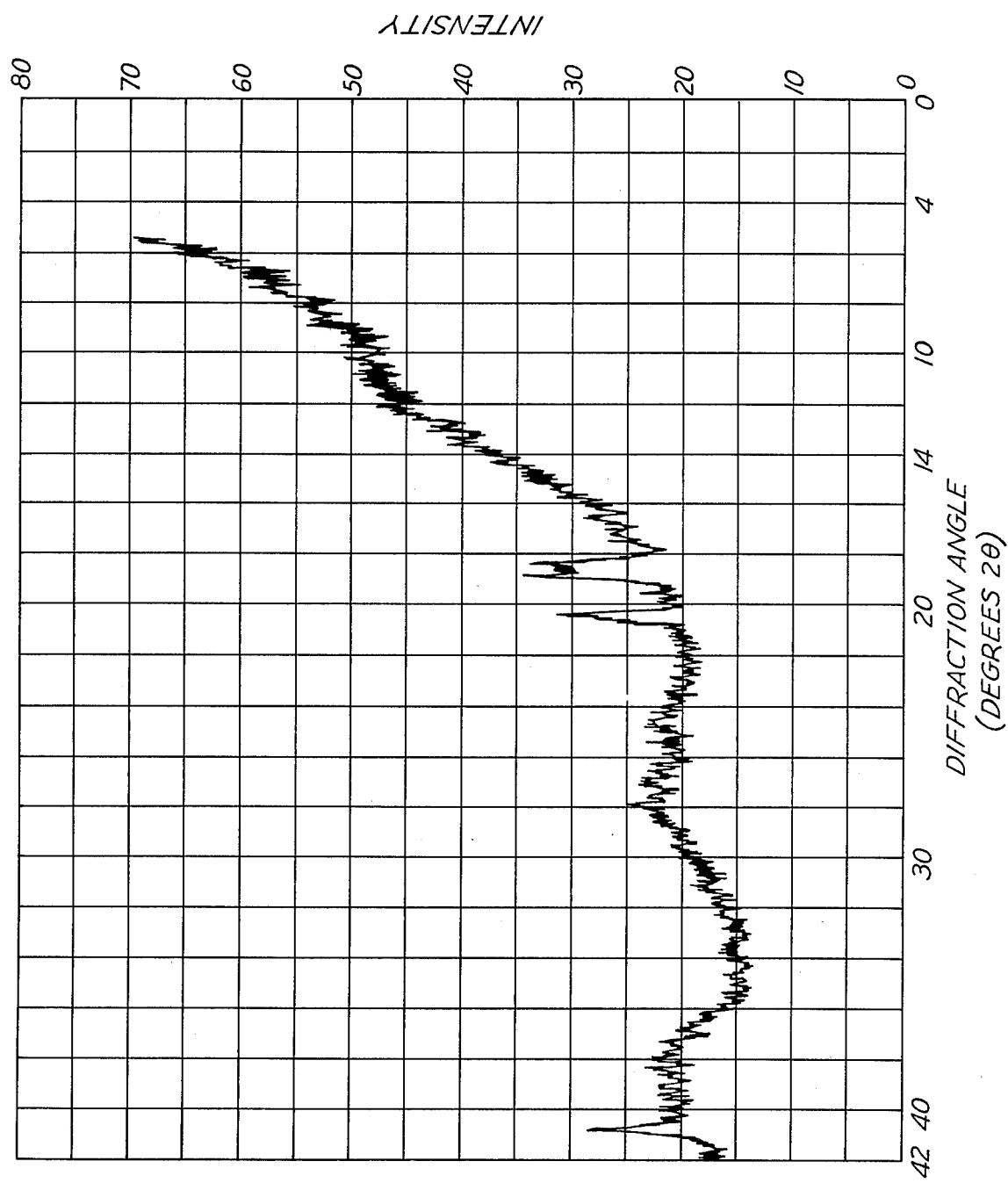

FIG. 5 is the X-ray diffraction pattern for an alumina before calcining which was prepared in accordance with Example 1 of U.S. Pat. No. 3,846,285 referred to above. The alumina of FIG. 5 is about 10% bayerite (trihydrate of alumina) and the remainder a substantially uniform gelatinous material which is an alumina dihydrate (pseudoboehmite). A comparison of FIGS. 1 and 5 readily shows the considerable differences between the X-ray diffraction patterns of these two aluminas. In FIG. 5 a line width at about 14° (2 θ) cannot be measured, whereas the line width at about 14° (2 θ) and three-fourths maximum intensity is about 3° in FIG. 1, indicative of a larger crystallite size for the FIG. 1 material. A similar conclusion results from a comparison of FIG. 1 with FIGS. 3 and 4. On the other hand, FIG. 2 (which represents an alumina prepared in accordance with the teachings of the '285 patent except no trihydrate is present) does have a measurable line width at about 14° (2 θ) and three-fourths maximum intensity, i.e. about 1.6°, which indicates an even larger crystallite size. A further comparison of FIG. 1 (the invention) and FIG. 2 (prior art), however, shows that the peak at about 14° (2 θ) bottoms out at a different level at about 10° (2 θ).

The "bottoming out" at a different level is the result of differences in the nature and intensity of the continuous small angle X-ray scattering. This continuous small angle scattering is related to the existence of matter in the form of small particles, or to heterogeneities in the scattering medium. When this continuous small angle scattering extends to larger angles, it is an indication of smaller particles (or smaller pores) or to greater disorder in the lattice which results in increased heterogeneity. This scattering is practically independent of the crystallinity of the sample or short range order of the atoms comprising the particles, and is not affected by deformations of the crystal lattice. It depends only on the exterior form and dimensions of the particles. On the other hand, a decrease in the crystallite size or an increase in the disorder or deformation of the crystal lattice results in an increase in the width of the X-ray diffraction lines arising from the crystalline component of the sample. Thus by observing both the nature of the small angle scattering and the width of the lines of the X-ray diffraction pattern, it is possible to assess the particle size of the sample including any amorphous fraction that might be present and the crystallite size or the deformation of the lattice of the crystalline component.

The "bottoming out" at a higher level in FIG. 1 than in FIG. 2 is due to the combined effects of stronger small angle scattering at larger angles and broader X-ray diffraction lines in FIG. 1. This indicates that the alumina hydrate of FIG. 1 has smaller particles and small crystallites (or greater deformation of the crystal lattice) than the alumina hydrate of FIG. 2. The reasons for this difference in particle size and crystallite size are not fully understood, but experience has shown that whatever factors are responsible for the differences in the development of larger particles and crystals in these alumina hydrates will also affect the structural transformation that occurs as a result of the dehydration during the calcination step. This is illustrated, for example, by the differences in the pore properties of the calcined aluminas obtained as a result of calcining two alumina hydrates of the type shown in FIG. 2 and FIG. 4. The alumina hydrate of FIG. 4 has smaller particles and smaller crystallites than the alumina hydrate of FIG. 2. The pore characteristics of the two calcined products are as follows:

|  | Figure 2 | Figure 4 |
|---|---|---|
| Pore Vol (cc/g) | 0.40 | 0.44 |
| Avg. Pore Rad. (A) | 29 | 25 |
| Surface Area (m²/g) | 278 | 359 |
| PSD (Vol %) |  |  |
| 100–300 A (rad.) | 1.9 | 0.5 |
| 50–100 | 3.0 | 2.2 |
| 30–50 | 26.0 | 5.1 |
| 20–30 | 52.0 | 65.7 |
| 10–20 | 17.4 | 26.7 |

The calcined alumina derived from the FIG. 4 alumina hydrate has a significantly larger surface area and a larger percentage of small pores than the alumina derived from the FIG. 2 alumina hydrate.

Further comparison of the X-ray diffraction patterns of the alumina hydrates of FIG. 1 and FIG. 2 shows that the lines in FIG. 1 are not only broader but also are somewhat weaker than those in FIG. 2. This is shown by the relative intensity of the line centered at 38.4° (2 θ) in the two patterns. In FIG. 2 this line has an intensity of 142 arbitrary units, as measured by the area under the peak, whereas in FIG. 1 this line has an intensity of only 120 units. This, coupled with the significantly higher intensity of small angle scattering at angles out to 9° (2 θ) in FIG. 1, indicates that an amorphous or highly disordered component is present in the alumina hydrate of FIG. 1 which is not present, at least to the same extent, in the hydrate of FIG. 2.

In the '285 patent (Beuther et al) the distinctive properties of the activated alumina were attributed to a mixture of crystalline phases (trihydrate and pseudoboehmite) in the precursor alumina hydrates. In the present case, an apparently analogous result is obtained from a mixture of the pseudoboehmite phase and an amorphous or highly disordered phase in the precursor alumina hydrate.

Whether an X-ray diffraction pattern similar to FIG. 1 represents (i) a certain "disorder" in a small crystallite precursor pseudoboehmite alumina, (ii) a mixture of phases, or (iii) some other phenomenon, it has been discovered, in accordance with the invention, that an alumina which before calcining has (i) from about 1.2 to about 2.6 moles of water per mole of alumina and (ii) an X-ray diffraction pattern similar to FIG. 1 is an unusually and unexpectedly active support for hydrogenation catalysts to be used for the desulfurization of feedstocks at mild conditions. Thus the alumina precursors of this invention require not only a large (020) line width (2° to 5°) at three-fourths maximum intensity at about 14° (2 θ) but also require a "bottoming out" factor. To measure the "bottoming out" factor, an "intensity ratio" was developed which is a ratio of the maximum intensity (height) of the (020) line to the minimum point of the background intensity at about 10° (2 θ), measured, of course, from the base line. The improved alumina supports for the catalyst of this invention were found to have unusually low intensity ratios, indicating a particular combination of disorder in the alumina hydrate structure and small particles which, for reasons not understood, results after calcining in an unusually active support for catalysts for the hydrodesulfurization of hydrocarbons. Referring to FIG. 1, the intensity ratio is the maximum intensity (about 48) divided by the minimum point of the background intensity at about 10° (2 θ) (about 24), or about 2.0. Suitable intensity ratios are from about 1.3 to 5.0. The intensity ratio for the alumina in FIG. 2 (prior art) is about 10, while intensity ratios are not measurable for the alumina precursors represented by FIGS. 3, 4 and 5.

Many techniques for the preparation of alumina hydrates are well known to those having ordinary skill in the alumina preparation art, including several techniques for the preparation of the crystalline alumina hydrates containing from 1.2 to 2.6 moles of water of hydration per mole of $Al_2O_3$, i.e. an "alumina dihydrate" or "pseudoboehmite" alumina. U.S. Pat. No. 3,846,285 referred to above, for example, describes several general methods of preparation in Columns 4 and 5, and working Example 1 of the '285 patent details the preparation of the alumina shown in FIG. 5. Any method of preparation which provides an alumina precursor having the above-described X-ray diffraction pattern characteristics in addition to 1.2 to 2.6 moles of water per mole of alumina is satisfactory. One suitable method is to add a small amount of an aluminum salt such as aluminum chloride to water and then simultaneously add streams of aqueous aluminum chloride and ammonium hydroxide so as to maintain a pH between about 4.5 and less than 7, preferably less than 6.5. If a pH of less than about 4.5 is employed, a thick gel forms which is difficult to break, and thus the minimum pH should be some pH above this thick gel point. A pH above 6.5 to 7 should be avoided during the preparation because the higher initial pH's tend to result in the formation of alumina hydrates such as bayerite, nordstrandite and gibbsite. After the desired amount of aluminum chloride has been added, the ammonium hydroxide addition is continued until a pH of 8 to 10, preferably 9 to 10, is achieved to complete the crystallization more rapidly.

Further, it is important but not critical that the precipitated alumina dihydrate be dried rapidly since the precipitate as formed is unstable and tends to transform into other alumina hydrates having a higher or lower water of hydration content. One with ordinary skill in the art will soon be able to determine through a few simple drying experiments the amount of time he can afford to expend between precipitation and drying in order to retain the X-ray diffraction pattern characteristics for the precursor alumina as defined above. The drying, of course, tends to "set" the X-ray diffraction pattern characteristics. Normally, drying occurs at temperatures from 250° to 500° F. (121° to 260° C.) for times of from 1 to 20 hours.

In the preparation of the alumina hydrate containing from 1.2 to 2.6 moles of water of hydration, any aluminum salt may be employed. For instance, aluminum nitrate, chloride, acetate, formate, fluoride, sulfate and other salts of aluminum may be used. Also, a variety of bases such as sodium hydroxide, ammonium hydroxide, potassium hydroxide, etc., may be employed to precipitate the aluminum hydrate. It is preferred, however, to employ salts of aluminum and bases which do not give reaction by-products or salts which are difficult to separate from the desired alumina hydrates. For instance, if aluminum sulfate and/or sodium hydroxide are employed or even if aluminum sulfate or ammonium hydroxide are employed, sulfate salts are formed which are difficult to remove by water washing. On the other hand, if aluminum nitrate, aluminum chloride or an aluminum salt of an organic acid is used and a base, such as ammonium hydroxide, is employed, the salts which are formed are readily soluble in water and can easily be removed from the aluminum hydrate by water washing and/or calcination. Regardless of the specific aluminum salt and base that are used, the final product should be substantially free of such salts.

The carrier employed in the process of this invention can be in the form of irregular particles obtained by crushing or grinding or it can be in the form of more regular shapes such as cylindrical extrudates or spherical beads. In the preparation of beads such as for use in fluidized bed operations or in the preparation of extrudates of enhanced strength, the use of binder materials such as silica, for example in the form of silicic acid or synthetic and natural clays, can be employed. Such binders are present in an amount from about 8 to 10% by weight up to about 30% by weight based upon the total.

The alumina carriers described above are preferably calcined by heating in air for time periods from 1 to 20 hours before the addition of the metalliferous hydrogenation components as described earlier. Such calcining, however, prior to the addition of metals, is not critical but is preferred. Added drying and calcining occurs, of course, after metals addition.

The invention will be further described with reference to the following experimental work.

EXAMPLE 1

A solution of an aluminum salt was prepared by dissolving 483 grams of $AlCl_3.6H_2O$ in 4 liters of distilled water. A separate ammonium hydroxide solution was prepared by dissolving 1 liter of concentrated ammonium hydroxide in 2 liters of distilled water. A stirring medium was provided by adding 1 liter of distilled water to a mixing vessel, and a motor-driven stirrer and pH electrodes were positioned in this water. The aluminum salt solution and the ammonium hydroxide solution were added separately, in thin streams, to the mixing zone, accompanied by vigorous stirring. The relative rate of addition of these two solutions were adjusted to maintain a constant pH = 5.5 in the mixing zone where a precipitate was formed by the reaction of the two solutions. After all of the aluminum salt solution was added, the addition of the ammonium hydroxide solution was stopped, and stirring was continued for five minutes. Addition of the ammonium hydroxide solution was then continued to raise the pH of the final mixture to 10.0. The precipitate was left to age in the mother liquor for one hour, after which the precipitate was recovered by filtration and washed on the filter with 4 liters of distilled water, the pH of which was adjusted to 10.0 by the addition of ammonium hydroxide. The washed filtercake was dried at 120° C., and the X-ray diffraction pattern of this oven-dried product is shown in FIG. 1.

Analysis of the precursor alumina did not reveal any trihydrate of alumina, despite the aging of the precursor. The (020) line width of the X-ray diffraction pattern at about 14° (2 $\theta$) at three-fourths maximum intensity and the intensity ratio for the precursor alumina before calcining are given in Table I below.

FIG. 1 is the X-ray diffraction pattern for the oven-dried precursor of aluminum made in accordance with this Example 1.

EXAMPLE 2

The preparation of Example 1 was repeated except the aluminum chloride solution contained 1000 grams of $AlCl_3.6H_2O$ in 10 liters of distilled water. Also, the filtercake was washed with 10 liters of water, the pH of which was adjusted to 10 with $NH_4OH$.

Analysis of the precursor alumina showed the presence of about 2% by weight of the trihydrate of alumina. It was determined by X-ray diffraction that about 98% of the alumina hydrate was the dihydrate having from 1.2 to 2.6 moles of water per mole of alumina. The (020) line width of the X-ray diffraction pattern at about 14° (2 θ) at three-fourths maximum intensity and the intensity ratio for the precursor alumina before calcining are given in Table I below.

EXAMPLE 3

Example 2 was repeated. Analysis of the precursor alumina did not reveal the presence of any trihydrate of alumina despite the aging of the precursor alumina. The (020) line width of the X-ray diffraction pattern at about 14° (2 θ) at three-fourths maximum intensity and the intensity ratio for the precursor alumina before calcining are given in Table I below.

EXAMPLE 4

The preparation of Example 1 was repeated except the precursor alumina was not aged for one hour before drying. No trihydrate of alumina was found by analysis. The (020) line width of the X-ray diffraction pattern at about 14° (2 θ) at three-fourths maximum intensity and the intensity ratio for the precursor alumina before calcining are given in Table I below.

EXAMPLE 5

The preparation of Example 4 was repeated except the pH during precipitation of the alumina was maintained at about 4.5 rather than 5.5, and the final pH was about 9.5 rather than 10. Again, no trihydrate of alumina was found in the precursor. The (020) line width of the X-ray diffraction pattern at about 14° (2 θ) at three-fourths maximum intensity and the intensity ratio for the precursor alumina before calcining are given in Table I below.

EXAMPLE 6

The preparation of Example 4 was repeated except the pH during precipitation of the alumina was maintained at about 6.2 rather than 5.5. Again, no trihydrate of alumina was found in the precursor. The (020) line width of the X-ray diffraction pattern at about 14° (2 θ) at three-fourths maximum intensity and the intensity ratio for the precursor alumina before calcining are given in Table I below.

EXAMPLE 7

A first solution was made by dissolving 2000 grams of $AlCl_3.6H_2O$ and 8000 grams of $NH_4Cl$ in 20 liters of water (ph = 2). A second solution was formed by admixing 3000 cc of water and 3000 cc of ammonium hydroxide. The second solution was added slowly with vigorous stirring to solution 1. The slurry gelled after 3500 cc of solution 2 had been added. The gel was broken by vigorous stirring by hand, and the addition of the ammonium hydroxide solution (No. 2) was continued until a pH of 8.0 was reached. This required the addition of substantially all of the ammonium hydroxide solution, and stirring was continued for an additional 30 minutes. The slurry was filtered; washed briefly on the filter; and oven dried. The X-ray diffraction pattern of the oven-dried material is shown on FIG. 2. The (020) line width of the X-ray diffraction pattern at about 14° (2 θ) at three-fourths maximum intensity and the intensity ratio for the precursor alumina before calcining are given in Table 1 below.

TABLE 1

CHARACTERISTICS OF (020) X-RAY DIFFRACTION LINE OF ALUMINA HYDRATE PRECURSORS

| Ex. No. | Line Width at about 14° (2 θ) at ¾ max. intensity | Intensity Ratio Peak/min. at about 10° (2 θ) |
|---|---|---|
| 1 | 3.0° | 2.0 |
| 2 | 4.3° | 1.6 |
| 3 | 3.6° | 1.8 |
| 4 | 4.4° | 1.6 |
| 5 | 2.3° | 2.8 |
| 6 | 2.7° | 1.8 |
| 7 | 1.6° | 10 |

Referring to Table 1, it can be observed that the line widths of all of the precursor aluminas from Examples 1 through 7 were relatively wide, the widest being 4.4°. The intensity ratios of the aluminas of Examples 1 through 6 are relatively small (less than 3), whereas the intensity ratio from the alumina from Example 7 (the prior art) was relatively high at 10.

EXAMPLE 8

A solution of an aluminum salt was prepared by dissolving 9460 grams of $AlCl_3.6H_2O$ in 40 liters of distilled water. To this solution was added 1000 grams of glacial acetic acid to provide a final solution having a pH of 1.49 at 24° C. A separate dilute ammonium hydroxide (8% $NH_3$) solution was prepared by dissolving 10 liters of concentrated ammonium hydroxide in 25 liters of distilled water. The dilute ammonium hydroxide solution was added to the aqueous aluminum chloride and acetic acid solution with stirring to form a gel at a pH in the range from 4 to 5 at 25° C. Addition of the ammonium hydroxide solution was then continued to raise the pH of the final mixture to 8. Transformation to alumina trihydrate, as described above, was effected by stirring this material from 10 to 15 minutes after the pH of 8 was reached. Further transformation was effected by placing the material on a filter and washing with a dilute ammonium hydroxide solution (0.028% $NH_3$) until the conductivity of the filtrate reached 1000 ppm.

The filtercake consisted of two discrete phases or layers at the end of the washing operation. The top layer represented about 10 to 15% by volume of the total filtercake and consisted mainly of bayerite and was white and gritty. The lower layer was gelatinous, substantially uniform and consisted of about 10 to 15% bayerite dispersed in alumina gel. The top layer was discarded and the lower layer was oven dried at 250° F. (121° C.) for 16 hours and thereafter sized to 14×30 mesh granules and calcined at 900° F. (482° C.) for 16 hours. FIG. 5 is the X-ray diffraction pattern for the oven-dried precursor alumina made in accordance with this Example 8.

There is no line width or intensity ratio for the material prepared in accordance with this Example, and thus although the material is about 85% to 95% alumina dihydrate, the X-ray diffraction pattern characteristics are considerably different in the 8° to 16° (2 θ) region.

EXAMPLE 9

A first solution of 5000 grams of $AlCl_3.6H_2O$ in 40 liters of water was prepared. A second solution was made by dissolving 5 parts of ammonium hydroxide with 12 parts of water. Approximately 10 liters of solution 1 were added to a mixing vessel containing 8 liters of water, and the pH was found to be 3.1. The ammonium hydroxide (second solution) was slowly added with vigorous stirring until a pH of 6.5 was achieved. A thick gel formed at an intermediate pH, which had to be broken with vigorous hand-stirring. The remainders of solutions 1 and 2 were then added simultaneously, at a slow rate in such a ratio that the pH of 6.5 was maintained. When all of solution 1 was added, stirring was continued together with the addition of the ammonium hydroxide solution until a pH of 9.0 was reached.

The slurry was filtered immediately and washed with 50 liters of water adjusted to a pH of 9.0 with ammonium hydroxide. The total elapsed time from the completion of the precipitation until the filtercake was removed from the filter after washing was 5 ¾ hours. The filtercake was oven dried at 125° C., and an X-ray diffraction pattern was obtained and is shown on FIG. 3. Like Example 8, the alumina from Example 9 showed no (020) line width or intensity ratio in the region of 14° (2 $\theta$).

EXAMPLE 10

The preparation of Example 9 was repeated except the final pH during precipitation was 8.0. The wash water had a pH of 8.0, and the total elapsed time from the beginning of precipitation until the filtercake was removed from the filter was 4 hours and 5 minutes. The X-ray diffraction pattern for the oven-dried material is shown on FIG. 4, and again there is no (020) line width or intensity ratio in the 8° to 16° (2 $\theta$) region.

EXAMPLE 11

The catalyst for this Example is a commercially prepared catalyst containing 0.5 weight percent nickel, 1.0 weight percent cobalt, and 8 weight percent molybdenum on a gamma-alumina support.

Each of the dried and calcined alumina composites shown in Examples 1 through 9 above was impregnated with nickel, cobalt and molybdenum solutions, after which each catalyst was again oven dried at 250° F. (121° C.) for 16 hours and calcined at 900° F. (482° C.) for 16 hours. Each of the final catalysts contained 0.5% by weight nickel, 1% by weight cobalt, and 8% by weight molybdenum.

Each of the catalysts made from the aluminas of Examples 1 through 9 and the catalyst of Example 11 above were evaluated for the desulfurization of a reduced Kuwait crude whose properties are shown on Table 2 below.

TABLE 2

| | |
|---|---|
| Gravity, °API, D287 | 16.8 |
| Sulfur, wt % | 3.76 |
| Nickel, ppm | 14 |
| Vanadium, ppm | 47 |
| Carbon Residue, | |
| Ramsbottoms, wt % | 8.34 |
| Pentane Insol, D893, wt % | 6.90 |
| Distillation: | |
| % Condensation at | 760 mm |
| 5 | 611° F. (322° C.) |
| 10 | 667° F. (353° C.) |
| 20 | 740° F. (393° C.) |
| 50 | 929° F. (498° C.) |
| 70 | 1014° F. (545° C.) |

The test conditions were: 1000 psig (6.89 MPa); 700° F. (371° C.); 1 LHSV; with the addition of 5000 SCF of hydrogen per barrel of feedstock. The feedstock was passed downflow through a bed of the catalyst, and the products were recovered and analyzed for sulfur content by standard combustion technique (Leco method).

The product sulfur with time for each of the catalysts shown on Examples 1–9 and 11 above is summarized in Table 3 below, in addition to the percent desulfurization obtained after 40 hours on-stream.

TABLE 3

DESULFURIZATION OF REDUCED KUWAIT CRUDE

| Catalyst from Ex. No. | Wt % Sulfur in Liquid Product at: | | | Wt % Desulfurization After 40 hours On-Stream |
|---|---|---|---|---|
| | 10 hrs. | 20 hrs. | 40 hrs. | |
| 1 | 0.92 | 0.96 | 0.98 | 73.9 |
| 2 | 0.89 | 0.91 | 0.92 | 75.5 |
| 3 | 0.88 | 0.89 | 0.90 | 76.1 |
| 4 | 1.06 | 1.075 | 1.095 | 70.9 |
| 5 | 1.035 | 1.07 | 1.105 | 70.6 |
| 6 | 1.07 | 1.13 | 1.16 | 69.1 |
| 7 | 2.08 | 2.18 | 2.25 | 40.2 |
| 8 | 1.14 | 1.18 | 1.22 | 67.6 |
| 9 | 1.40 | 1.41 | 1.45 | 61.4 |
| 10 | — | — | — | — |
| 11 | 1.04 | 1.20 | 1.35 | 64.1 |

Figure 6:
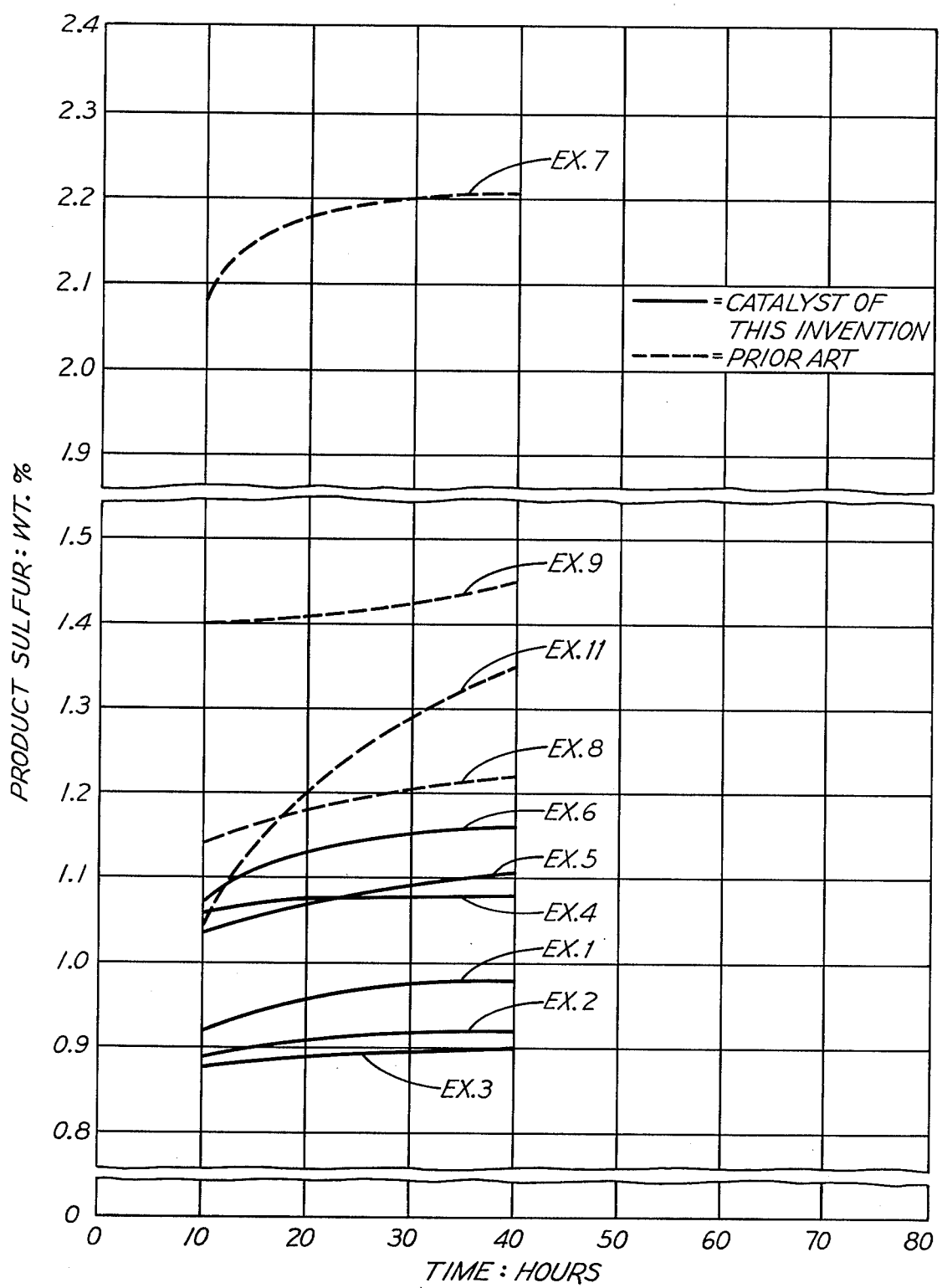

The results in Table 3 are also shown graphically on FIG. 6. Referring to Table 3 and FIG. 6, it can readily be seen that the catalysts prepared using the aluminas of this invention as the catalyst support (Exs. 1–6 above) resulted in a much lower weight percent sulfur in the liquid product (a better percent desulfurization) than catalysts prepared using as a support the aluminas of the prior art (Exs. 7,8,9 and 11) In addition, the commercial catalyst of Ex. 11 has poorer aging characteristics than the catalysts using the aluminas of the present invention (Exs. 1–6).

Resort may be had to such variations and modifications as fall within the spirit of the invention and the scope of the appended claims.

We claim:

1. A hydrodesulfurization process which comprises contacting a sulfur-containing charge stock under mild conditions including a temperature from about 600° to about 1000° F. and a hydrogen partial pressure of from about 50 to about 1200 psig with a hydrodesulfurization catalyst comprising from 2 to 25 weight percent of a metalliferous hydrogenation component on a substantially silica-free alumina hydrate which after drying and before calcining comprises an alumina hydrate:
   containing from about 1.2 to about 2.6 moles of water of hydration per mole of $Al_2O_3$;
   and having an X-ray diffraction pattern wherein the width of the (020) line at 14° (2 $\theta$) at three-fourths maximum intensity is from about 2.0° to about 2.0°; and the intensity ratio relative to the intensity at 10° (2 $\theta$) is about 1.3 to about 5.0.

2. A process according to claim 1 wherein said charge stock is a petroleum residual fraction.

3. A process according to claim 2 wherein the metalliferous hydrogenation component comprises at least one metal selected from the metals of Groups VI and VIII of the Periodic Table.

4. A process according to claim 3 wherein the hydrodesulfurization catalyst contains in addition a promoting amount of a metal from Group IVB.

5. A process according to claim 4 wherein the amount of the Group IVB metal based on the metal in the zero valent state is from 1 to 10% by weight of the total catalyst.

6. A process according to claim 3 wherein the hydrogenation component is a mixture of nickel, cobalt and molybdenum.

7. A process according to claim 1 wherein the alumina hydrate support is formed by precipitating the alumina hydrate containing from 1.2 to 2.6 moles of water of hydration per mole of $Al_2O_3$ by the simultaneous addition of an aqueous solution of an aluminum salt and an aqueous base at a pH between about 4.5 and less than 7 until the addition of the aluminum salt is complete, and thereafter increasing the pH in the precipitation medium by the continued addition of the aqueous base to a pH in the range of about 8 to 10.

8. A process according to claim 5 wherein the Group IVB metal is titanium.

9. A process according to claim 5 wherein the sulfur-containing charge stock is a residual petroleum fraction boiling substantially above 950° F. and containing the asphaltene content of the crude.

10. A process according to claim 1 wherein said alumina has an X-ray diffraction pattern substantially as shown on FIG. 1.

11. A process according to claim 1 wherein the alumina hydrate support is formed by:

precipitating the alumina hydrate containing from 1.2 to 2.6 moles of water of hydration per mole of $Al_2O_3$ by the simultaneous addition of an aqueous solution of an aluminum salt and an aqueous base at a pH between about 4.5 and less than 7 until the addition of the aluminum salt is complete;

increasing the pH in the precipitation medium by the continued addition of the aqueous base to a pH in the range of about 8 to 10;

aging said precipitated alumina hydrate at said increased pH;

recovering the precipitate;

washing the precipitate;

and drying the precipitate to obtain said alumina hydrate:

containing from about 1.2 to about 2.6 moles of water of hydration per mole of $Al_2O_3$.

12. A process in accordance with claim 11 wherein said pH during precipitation of said alumina hydrate is maintained constant at about 5.5; the increased pH by the continued addition of the an aqueous base is about 10; and the alumina hydrate is being aged for about one hour before recovering the precipitate.

* * * * *

UNITED STATES PATENT OFFICE
CERTIFICATE OF CORRECTION

Patent No. 4,081,353          Dated March 28, 1978

Inventor(s)   William L. Kehl and Angelo A. Montagna

It is certified that error appears in the above-identified patent and that said Letters Patent are hereby corrected as shown below:

Col. 12, line 52 - "2.0° to about 2.0°" should be
--2.0° to about 5.0°--.

Signed and Sealed this

Twenty-second Day of August 1978

[SEAL]

Attest:

RUTH C. MASON
Attesting Officer

DONALD W. BANNER
Commissioner of Patents and Trademarks